(12) United States Patent
Ito (10) Patent No.: US 12,360,087 B2
(45) Date of Patent: Jul. 15, 2025

(54) METHOD OF CONTROLLING LIQUID CHROMATOGRAPH AND LIQUID CHROMATOGRAPH

(71) Applicant: Hitachi High-Tech Corporation, Tokyo (JP)

(72) Inventor: Shinya Ito, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 280 days.

(21) Appl. No.: 18/036,950

(22) PCT Filed: Dec. 7, 2021

(86) PCT No.: PCT/JP2021/044920
§ 371 (c)(1),
(2) Date: May 15, 2023

(87) PCT Pub. No.: WO2022/138136
PCT Pub. Date: Jun. 30, 2022

(65) Prior Publication Data
US 2024/0019407 A1    Jan. 18, 2024

(30) Foreign Application Priority Data
Dec. 24, 2020   (JP) .................. 2020-215049

(51) Int. Cl.
*G01N 30/32* (2006.01)
*B01D 15/16* (2006.01)
*G01N 30/02* (2006.01)

(52) U.S. Cl.
CPC ........... *G01N 30/32* (2013.01); *B01D 15/163* (2013.01); *G01N 2030/027* (2013.01); *G01N 2030/326* (2013.01)

(58) Field of Classification Search
CPC ........... B01D 15/163; G01N 2030/027; G01N 2030/326; G01N 30/32; G01N 30/8658
See application file for complete search history.

(56) References Cited

U.S. PATENT DOCUMENTS 4,422,942 A    12/1983 Allington
11,859,600 B2 *  1/2024 Tsukada ................. F04B 49/06
(Continued)

FOREIGN PATENT DOCUMENTS

DE    102017126893 A1   5/2019
JP    03-179257 A       8/1991
(Continued)

OTHER PUBLICATIONS

WIPO International Preliminary Report on Patentability issued on Jul. 6, 2023 for PCT Patent Application No. PCT/JP2021/044920.
(Continued)

*Primary Examiner* — Kristina M Deherrera
*Assistant Examiner* — Gedeon M Kidanu
(74) *Attorney, Agent, or Firm* — Volpe Koenig (57) ABSTRACT

A method of controlling a liquid chromatograph that estimates the maximum value of the pressure reached during measurement before actually measuring a sample. The method includes a pump having a gradient function that feeds liquid while changing the composition of a plurality of eluents, according to gradient liquid feeding conditions, a sample filling unit for filling a sample, a separation column, an analysis flow channel connecting the pump to the separation column, and a pressure sensor which detects a pressure within the analysis flow channel during liquid feeding by the pump. A maximum pressure presumed during measurement is calculated based on an initial pressure as a pressure within the analysis flow channel when the pump starts feeding liquid and the gradient liquid feeding condi-
(Continued)

tions and that when the maximum pressure presumed is determined to be a predetermined upper pressure limit, the sample filling is not performed.

4 Claims, 6 Drawing Sheets

(56) References Cited

U.S. PATENT DOCUMENTS

| | | |
|---|---|---|
| 2015/0246297 A1 | 9/2015 | Bjernulf |
| 2018/0364205 A1 | 12/2018 | Beals et al. |
| 2022/0050091 A1 | 2/2022 | Sugiyama et al. |

FOREIGN PATENT DOCUMENTS

| | | |
|---|---|---|
| JP | 04-059798 A | 2/1992 |
| JP | 2015-526731 A | 9/2015 |
| JP | 2020-094817 A | 6/2020 |
| JP | 2020-524282 A | 8/2020 |

OTHER PUBLICATIONS

International Search Report, PCT/JP2021/044920, Mar. 1, 2020, 2 pgs.
Extended European Search Report issued on Oct. 25, 2024 for European Patent Application No. 21910285.2.

* cited by examiner

METHOD OF CONTROLLING LIQUID CHROMATOGRAPH AND LIQUID CHROMATOGRAPH

TECHNICAL FIELD

The present invention relates to a method of controlling a liquid chromatograph and a liquid chromatograph.

BACKGROUND ART

Separation columns of liquid chromatographs cannot be used above a predetermined pressure. The pressure in the flow channel fluctuates due to gradient during the measurement, and thus the separation column is required to be used considering the maximum pressure reached in the fluctuation.

PTL 1 relates to a technique for controlling the operation of a pump that feeds a liquid to a column of a liquid chromatograph. The literature discloses a technique "Provided is a method for controlling a liquid chromatography system including a system pump and a column in fluid communication with the system pump by a fluid flow channel. The method includes: a step of recording the system pressure at a flow channel position close to the system pump, a step of controlling the operation of the system pump in response to the recorded system pressure, a step of estimating a pre-column pressure based on the recorded system pressure, the characteristics of the flow channel, and the viscosity and flow rate of the liquid in the system, and a step of controlling the operation of the system pump in response to the estimated pre-column pressure" (see Abstract).

CITATION LIST

Patent Literature

PTL 1: JP2015-526731A

SUMMARY OF INVENTION

Technical Problem

In the method of controlling a liquid chromatograph in the related art as in PTL 1, the sample is actually measured, that is, the liquid is actually fed to the separation column, the system pressure is monitored, and the pressure fluctuation (time change) in the flow channel is measured. However, if the maximum pressure reached exceeds the upper limit during measurement, the measurement is stopped at that point.

Meanwhile, it is difficult to obtain the maximum pressure reached before actual measurement (liquid feeding) by calculation. This is because many liquid chromatographs can use general-purpose columns and various mobile phases, and parameters of the tubing that configure the flow channel (the diameter and the length of a column) and fluid parameters (viscosity and mixing ratio of the mobile phase) are indeterminate. Therefore, the maximum pressure reached of the column portion is predicted based on the experience of an operator.

As the separation column deteriorates, the initial pressure of the separation column increases. An increase in the initial pressure of the separation column makes it more difficult to predict the maximum pressure reached during the measurement.

The invention has been conceived in view of the technical problems as described above and an object of the invention is to provide a method of controlling a liquid chromatograph and a liquid chromatograph that estimate the maximum value of the pressure reached of the pressure during measurement before actually performing the measurement.

Solution to Problem

To achieve the object, for example, the configurations described in the claims are adopted.

The invention includes a plurality of means for solving the above problems. To give an example, the invention is a method of controlling a liquid chromatograph including a pump having a gradient function capable of feeding liquid while changing composition of a plurality of eluents, according to gradient liquid feeding conditions, a sample filling unit for filling a sample, a separation column, an analysis flow channel which connects the pump to the separation column passing through the sample filling unit, and a pressure sensor which detects a pressure within the analysis flow channel during liquid feeding by the pump, the method is characterized by including: calculating a maximum pressure presumed during measurement based on an initial pressure as a pressure within the analysis flow channel when the pump starts feeding liquid and the gradient liquid feeding conditions; and not performing the sample filling, when the maximum pressure presumed is determined to be a predetermined upper limit of pressure and more.

Advantageous Effects of Invention

According to the invention, a method of controlling a liquid chromatograph and a liquid chromatograph which estimate the maximum value of the pressure reached during measurement before actually performing the measurement can be provided.

Problems, configurations, and effects other than those described above become clear from the description of the following embodiments.

DESCRIPTION OF EMBODIMENTS

First Embodiment: Apparatus Configuration

Hereinafter, an embodiment of the invention is described with reference to the drawings.

Figure 1:
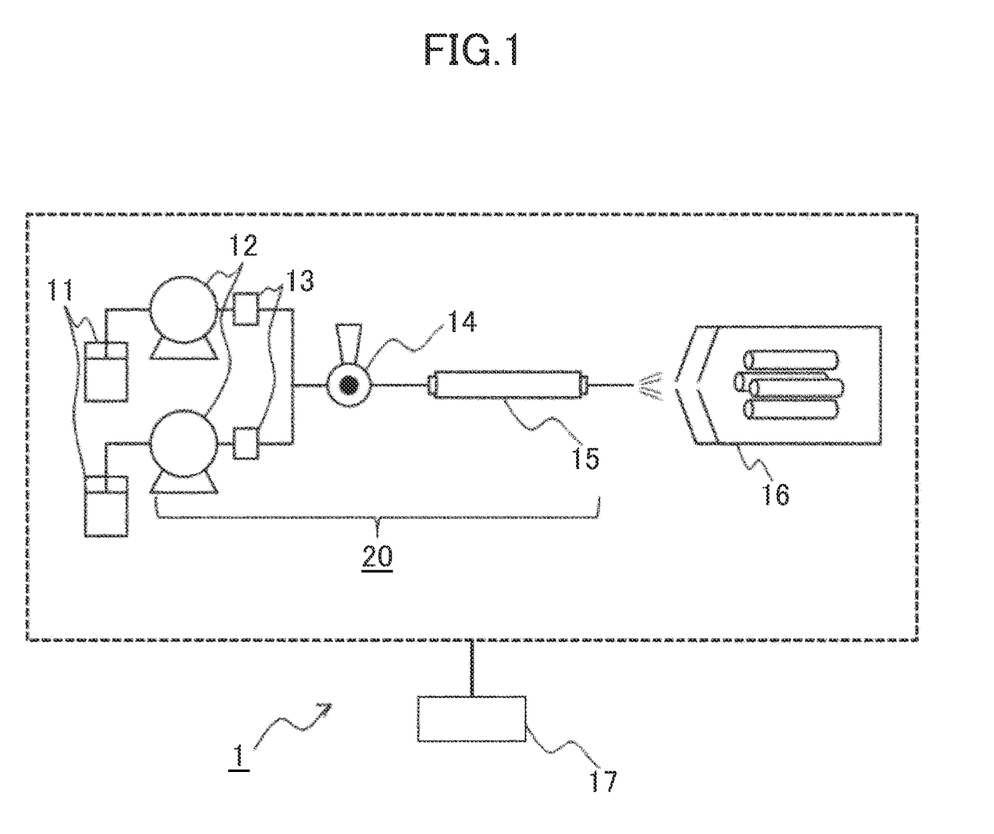
FIG. 1 is a constitutional view of a liquid chromatograph 1 according to a first embodiment.

FIG. 1 is a constitutional view of a liquid chromatograph 1 according to a first embodiment of the invention. The liquid chromatograph 1 is apparatus that separates a sample filled by a sample filling unit 14 by a stationary phase in a separation column 15 and an eluent supplied from an eluent bottle 11 (mobile phase) and detects the sample by a detector 16 installed downstream of the separation column 15. The liquid chromatograph 1 includes the eluent bottle 11, a pump 12, a pressure sensor 13, the sample filling unit 14, the separation column 15, a mass spectrometer as the detector 16, and a control unit 17.

A flow channel that connects the pump 12 to the separation column 15 passing through the sample filling unit 14 is referred to as an analysis flow channel 20 for convenience. Parameters such as liquid feeding resistance by a diameter, a length, or the like of a pipe or a component that configures the analysis flow channel 20 is known and is stored by the control unit 17.

Figure 2:
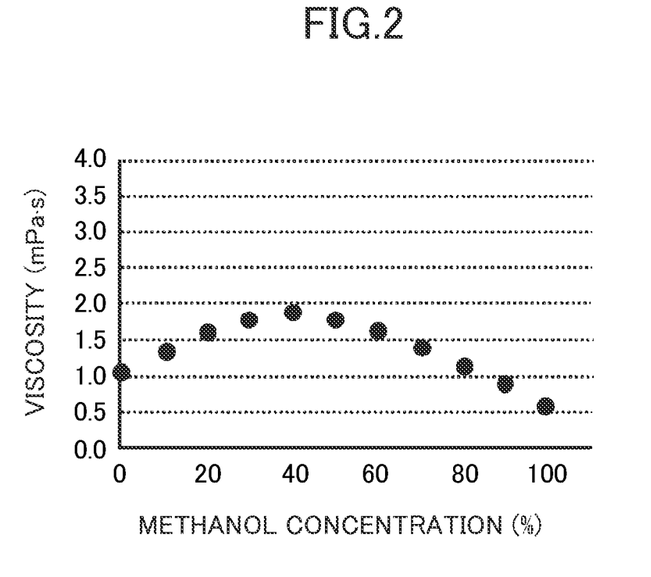
FIG. 2 is an example of parameters of eluent mixed after gradient liquid feeding.

Eluents are, for example, methanol and distilled water. Methanol as liquid A (first eluent) is stored in the first eluent bottle 11, and distilled water as liquid B (second eluent) is stored in the second eluent bottle 11. The liquids are mixed according to a gradient liquid feeding condition described below and fed to the separation column 15. The eluents are appropriately selected according to the sample or the separation column 15, but parameters (type, concentration, viscosity, and the like) of the eluents introduced into the apparatus are known and stored in the control unit 17. FIG. 2 is an example of parameters of eluents mixed after gradient liquid feeding and is obtained by plotting methanol concentration (%) on the horizontal axis and viscosity (mPa·s) on the vertical axis. For example, when gradient liquid feeding is performed so that the methanol concentration becomes 60%, the viscosity of the mixed eluents becomes about 1.6 mPa·s.

The pump 12 aspirates the eluents from the eluent bottle 11 and feeds the liquid to the analysis flow channel 20 based on instructions from the control unit 17. The pump 12 has a gradient function capable of liquid feeding while changing the composition of a plurality of solvents according to the gradient liquid feeding condition. In the invention, the pump 12 is provided for each eluent bottle 11. Based on instructions from the control unit 17 according to the gradient liquid feeding conditions, the pumps 12 feeds the eluents to the analysis flow channel 20 with the indicated parameters (a timing, a period, a flow rate, a flow speed, pressure, and the like).

The pressure sensor 13 is provided between the pump 12 and the sample filling unit 14 and detects the pressure of the analysis flow channel 20.

An autosampler (not illustrated) aspirates the sample introduced from a specimen pretreatment device or the like and introduces the sample to the sample filling unit 14. The sample filling unit 14 introduces the sample to the analysis flow channel 20 based on the instruction from the control unit 17.

The separation column 15 has a stationary phase inside. The separation column 15 separates the sample from the sample filling unit 14 by the stationary phase and the eluents fed from the pump 12. Parameters such as the diameter and the length of the column of the separation column 15, and liquid feeding resistance by the stationary phase or the like are known and stored by the control unit 17.

A mass spectrometer as the detector 16 is connected to the downstream of the separation column 15. The sample separated by the separation column 15 is introduced to the detector 16 based on the instruction from the control unit 17 and is detected.

The control unit 17 monitors the pressure of the analysis flow channel 20 detected by the pressure sensor 13 and determines the propriety of measurement by using the analysis flow channel 20, that is, changes the operation of the sample filling unit 14 when the predetermined condition is satisfied. Details of the conditions and changes to the operation are described below.

First Embodiment: Operation Procedure

Figure 3:
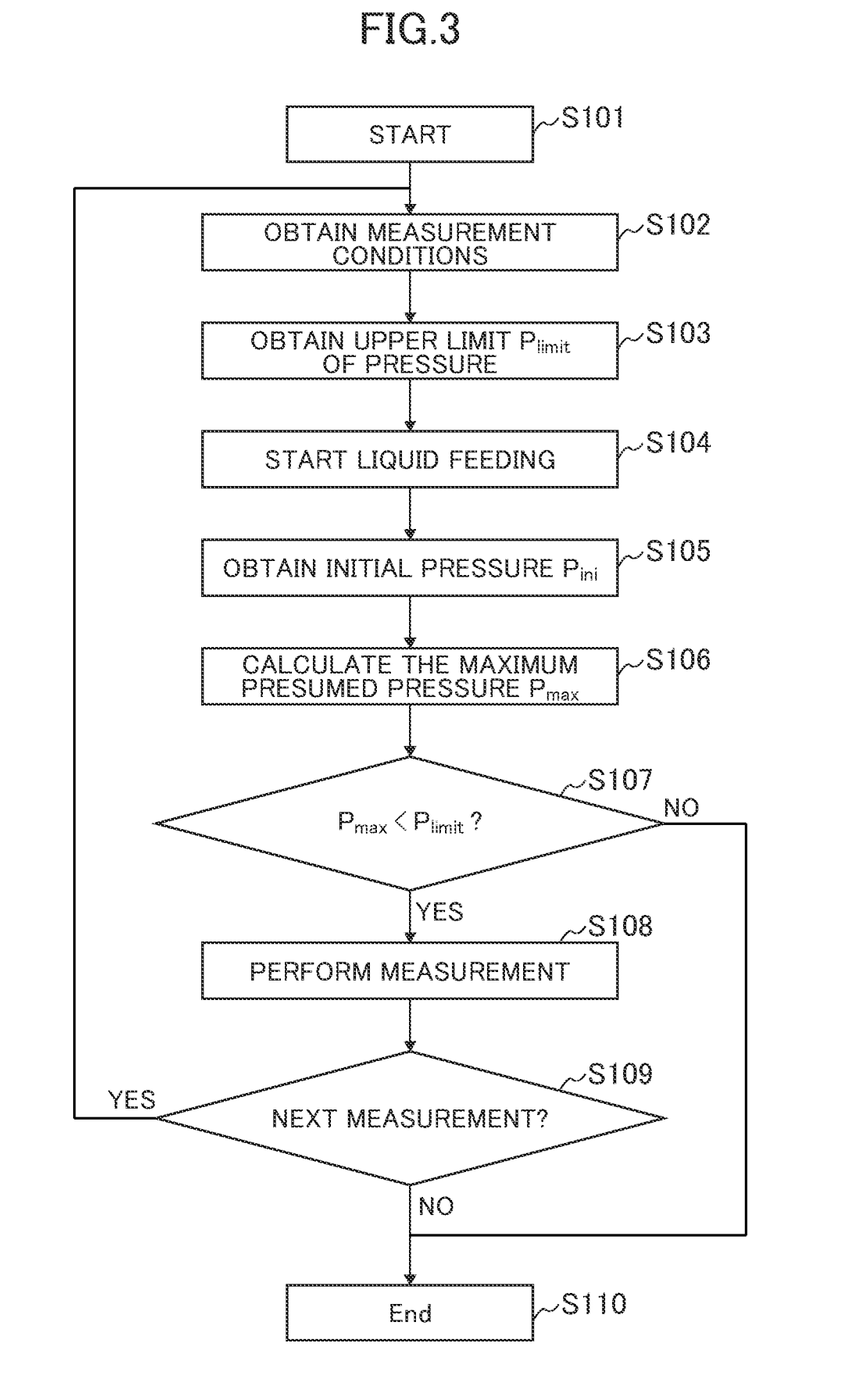
FIG. 3 is a flow chart for deciding the propriety of measurement using an analysis flow channel 20 according to the first embodiment.

FIG. 3 is a flow chart of determining a propriety of measurement by using the analysis flow channel 20 according to the first embodiment.

When a measurement instruction is received and the processing start S101 is performed, the control unit 17 performs measurement condition acquisition S102. The measurement conditions include the type of sample, the type of eluent, the gradient liquid feeding condition, the type of separation column 15, and the like. Based on the sample identification information and the analysis item information received from another control device (not illustrated), the control unit 17 reads measurement items corresponding to the sample identification information and the analysis item information from the data table stored in the control unit 17.

The control unit 17 performs acquisition S103 of an upper limit of pressure $P_{limit}$. The upper limit of pressure $P_{limit}$ is an upper limit of pressure that is determined by members configuring the analysis flow channel 20, particularly the separation column 15 and is permissible during liquid feeding. The control unit 17 reads the upper limit value of pressure corresponding to the separation column 15 (currently connected to the analysis flow channel 20) used for measurement from the data table described above and sets the upper limit value as the upper limit of pressure $P_{limit}$.

The control unit 17 instructs the pump 12 to perform liquid feeding start S104. Here, the control unit 17 acquires pressure of the analysis flow channel 20 from the pressure sensor 13 to perform acquisition S105 of initial pressure $P_{ini}$ at the time of liquid feeding start. The initial pressure $P_{ini}$ is a value acquired in a state in which liquid feeding from the pump 12 is in a steady state so that a constant pressure value can be detected and is, for example, an average value of pressure changes when liquid feeding continues at constant pressure for one minutes from the liquid feeding start.

The control unit 17 performs calculation S106 of maximum pressure presumed $P_{max}$. The calculation can be performed by a known pressure calculation method (estimating a pressure loss of each unit by the Darcy-Weisbach equation or the like) by using elements of the above-described known parameter such as the initial pressure $P_{ini}$, gradient liquid feeding condition, a diameter and a length of the analysis flow channel 20, and a viscosity of the mobile phase. Here, elements that are likely to change in each measurement are the gradient liquid feeding condition in the measurement condition and the initial pressure $P_{ini}$. Therefore, if the gradient liquid feeding condition and the initial pressure $P_{ini}$ are acquired as the parameters, other elements can be calculated as predetermined constants.

The control unit 17 performs comparison S107 between the maximum pressure presumed $P_{max}$ and the upper limit of pressure $P_{limit}$. If the maximum pressure presumed $P_{max}$ is less than the upper limit of pressure $P_{limit}$, measurement execution S108 is performed. If the maximum pressure presumed $P_{max}$ is the upper limit of pressure $P_{limit}$ and more, processing end S110 is performed.

In comparison S107 between the maximum pressure presumed $P_{max}$ and the upper limit of pressure $P_{limit}$, if the maximum pressure presumed $P_{max}$ is less than the upper limit of pressure $P_{limit}$, the control unit 17 performs measurement execution S108. That is, it is determined that measurement using the analysis flow channel 20 can be performed, and sample filling by the sample filling unit 14 is performed. Thereafter, the sample is separated by the separation column 15 and is detected by the detector 16.

The control unit 17 performs determination S109 whether there is next measurement. If there is the next measurement, measurement condition acquisition S102 of the next measurement is performed. If there is no next measurement, processing end S110 is performed.

First Embodiment: Summary

Figure 4:
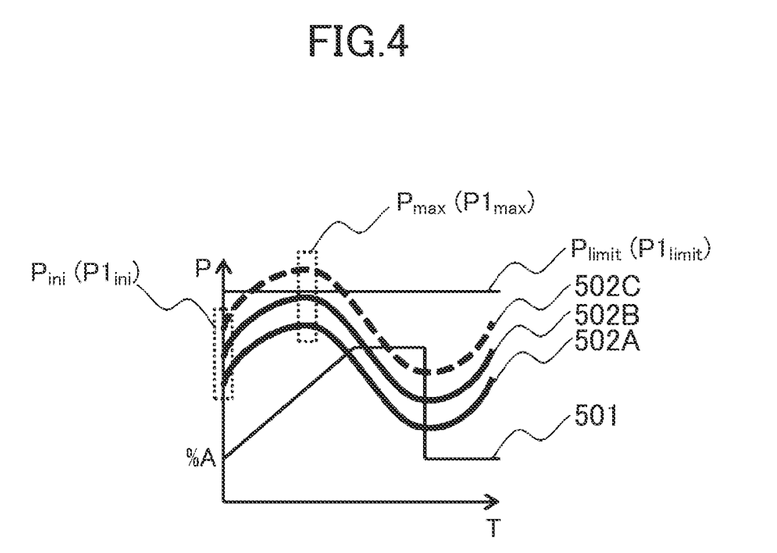
FIG. 4 is a graph concerned about comparison S107 between the maximum pressure presumed Pmax and the upper limit of pressure $P_{limit}$.

FIG. 4 is a graph concerned about comparison S107 between the maximum pressure presumed $P_{max}$ and the upper limit of pressure $P_{limit}$. The horizontal axis indicates time T, and the vertical axis indicates pressure P in the analysis flow channel 20. The viscosity of the eluents mixed after the gradient liquid feeding changes as illustrated in FIG. 2 by the gradient liquid feeding operation of the pump 12. In FIG. 4, change 501 of concentration % A of liquid A (methanol) is plotted. The initial pressure $P_{ini}$ changes by the deterioration of a member configuring the analysis flow channel 20, particularly, the separation column 15. Specifically, if the deterioration of the separation column 15 progresses, the initial pressure $P_{ini}$ increases. Therefore, by acquiring the initial pressure $P_{ini}$ whenever the measurement is performed, it is possible to calculate the maximum pressure presumed $P_{max}$ according to the latest state of the separation column 15.

In FIG. 4, a pressure change 502A when the separation column 15 is not used, a pressure change 502B when the separation column 15 is slightly deteriorated, and a pressure change 502C when the separation column 15 is further deteriorated are plotted. When the gradient liquid feeding condition changes with time, the viscosity of mixed eluents changes, and the pressure in the analysis flow channel 20 also changes. According to the invention, since the parameters required for the calculation of the maximum pressure presumed $P_{max}$ are known, the pressure in the analysis flow channel 20 can be estimated without performing the sample filling. By acquiring the initial pressure $P_{ini}$, the maximum pressure presumed $P_{max}$ can be calculated more accurately. In the example of the pressure change 502C when the separation column 15 is further deteriorated, the maximum pressure presumed $P_{max}$ is the upper limit of pressure $P_{limit}$ and more, the analysis flow channel 20 including the separation column 15 in such state is not used, and the sample filling by the sample filling unit 14 is not performed. Therefore, it is possible to stop measurement or to promote the user to replace the separation column 15 without wasting the sample.

Second Embodiment

Figure 5:
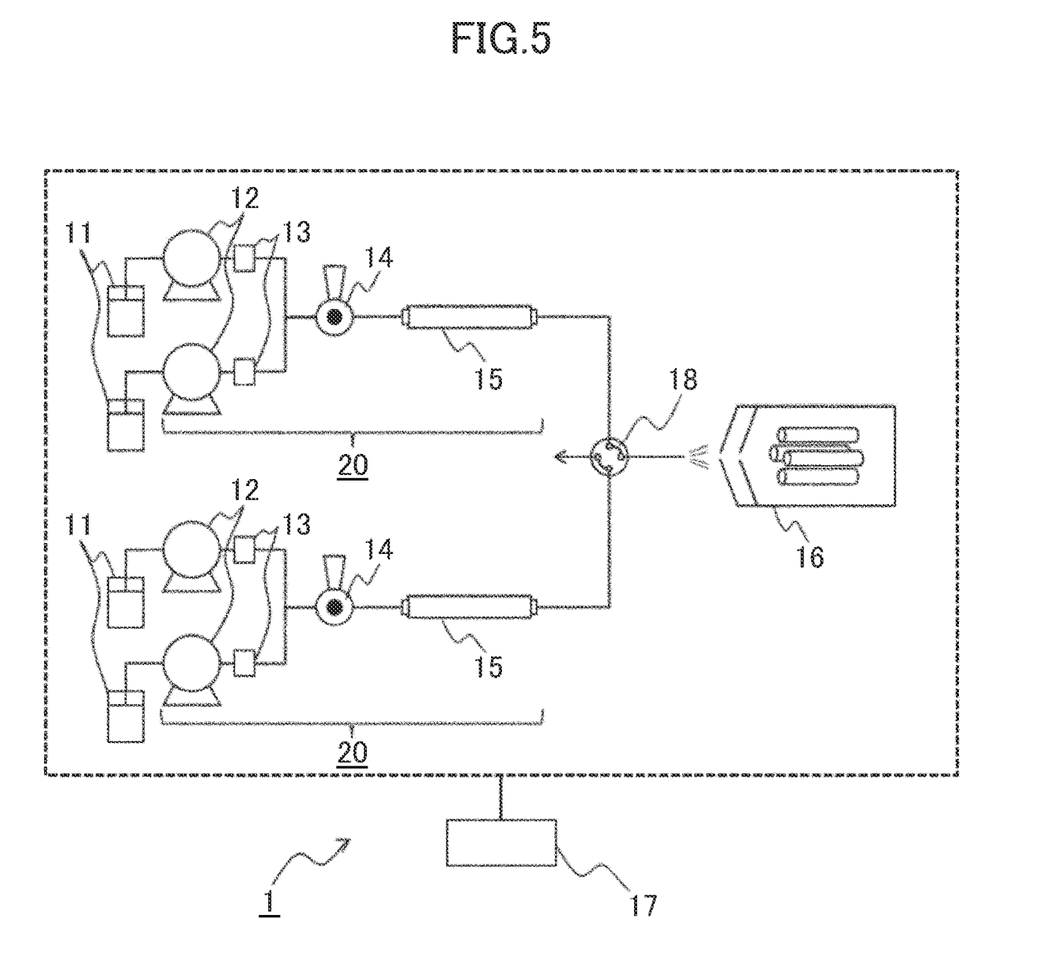
FIG. 5 is a constitutional view of a liquid chromatograph 1 according to a second embodiment.

FIG. 5 is a constitutional view of the liquid chromatograph 1 according to a second embodiment. According to the second embodiment, the configuration from the eluent bottle 11 to the separation column 15 described in the first embodiment is duplicated and is connected to the mass spectrometer as the detector 16 via a switching valve 18. The control unit 17 controls the entire configuration. Other configurations are the same as the first embodiment.

The sample from the autosampler (not illustrated) can be introduced to any one of the two sample filling units 14, and the sample filling unit 14 of the introduction destination is selected by the instruction from the control unit 17.

According to the invention, an example in which the configuration from the eluent bottle 11 to the separation column 15 described in the first embodiment is duplicated is described. However, the configuration from the eluent bottle 11 to the separation column 15 may be further duplicated and connected to the mass spectrometer as the detector 16 via the switching valve 18. The detector 16 may be arranged in parallel and, for example, two detectors 16 may be connected in parallel to the downstream of the switching valve 18.

Figure 6:
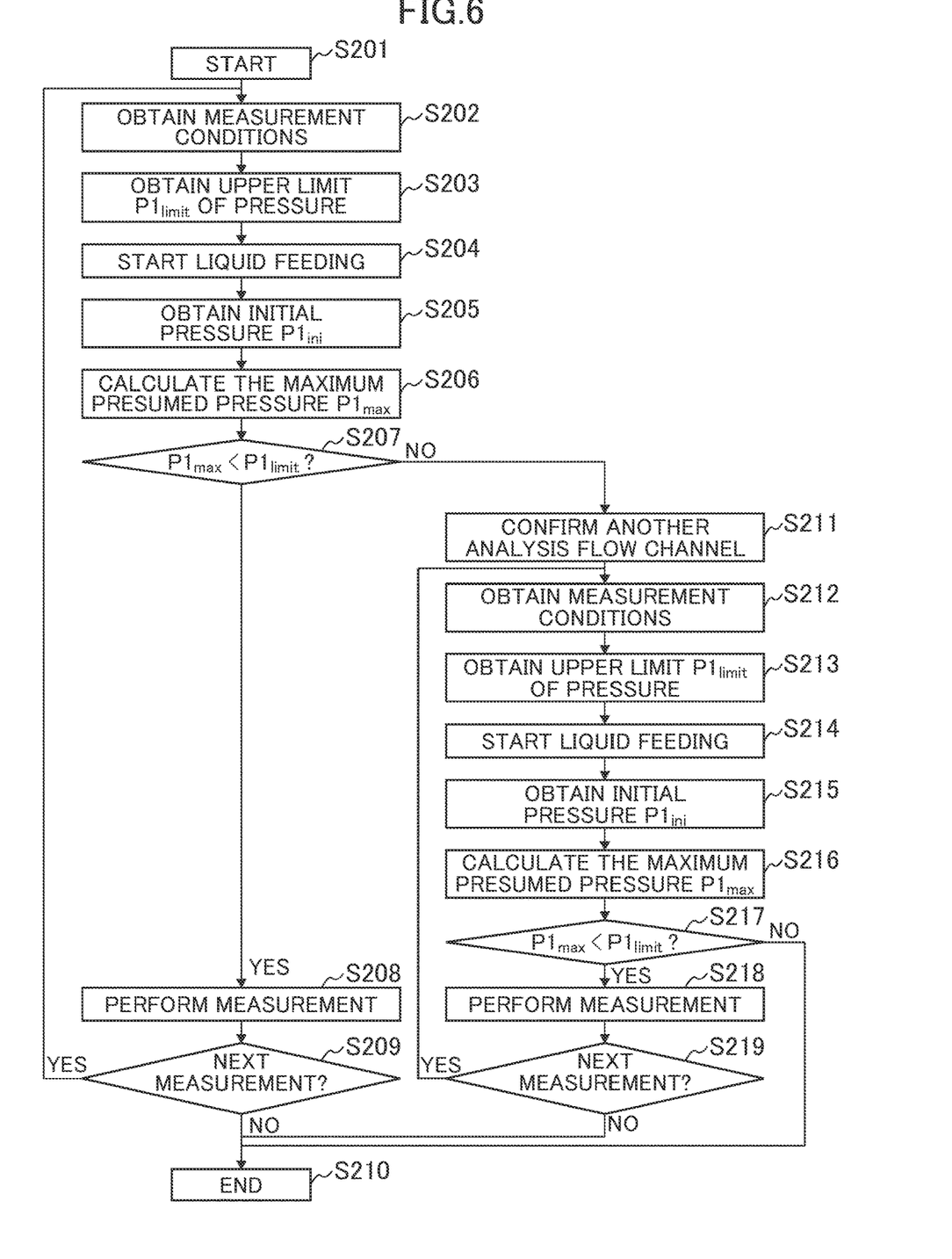
FIG. 6 is a flow chart for deciding the propriety of measurement using an analysis flow channel 20 according to the second embodiment.

FIG. 6 is a flow chart of determining a propriety of measurement by using the analysis flow channel 20 according to the second embodiment.

When a measurement instruction is received, and processing start S201 is performed, the control unit 17 performs measurement condition acquisition S202. The measurement conditions include the type of sample, the type of eluent, the gradient liquid feeding condition, the type of separation column 15, and the like. Based on the sample identification information and the analysis item information received from another control device (not illustrated), the control unit 17 reads measurement items corresponding to the sample identification information and the analysis item information from the data table stored in the control unit 17.

The control unit 17 performs acquisition S203 of an upper limit of pressure $P1_{limit}$. The upper limit of pressure $P1_{limit}$ is an upper limit of pressure that is determined by members configuring the first analysis flow channel 20, particularly the first separation column 15 and is permissible during liquid feeding. The control unit 17 reads the upper limit value of pressure corresponding to the first separation column 15 (currently connected to the first analysis flow channel 20) used for measurement from the data table described above and sets the upper limit value as the upper limit of pressure $P1_{limit}$.

The control unit 17 instructs the pump 12 of the first analysis flow channel 20 to perform liquid feeding start S204. Here, the control unit 17 acquires pressure of the first analysis flow channel 20 from the pressure sensor 13 of the first analysis flow channel 20 to perform acquisition S205 of initial pressure $P1_{ini}$ at the time of liquid feeding start.

The control unit 17 performs calculation S206 of maximum pressure presumed $P1_{max}$. The calculation can be performed by a known pressure calculation method by using elements of the above-described known parameter such as the initial pressure $P1_{ini}$, a diameter and a length of the first analysis flow channel 20, and a viscosity of the mobile phase. Here, elements that are likely to change in each measurement are the gradient liquid feeding condition in the measurement condition and the initial pressure $P1_{ini}$. Therefore, if the gradient liquid feeding condition and the initial pressure $P1_{ini}$ are acquired as the parameters, other elements can be calculated as predetermined constants.

The control unit 17 performs comparison S207 between the maximum pressure presumed $P1_{max}$ and the upper limit of pressure $P1_{limit}$. If the maximum pressure presumed $P1_{max}$ is less than the upper limit of pressure $P1_{limit}$, measurement execution S208 is performed by using the first analysis flow channel 20. If the maximum pressure presumed $P1_{max}$ is the upper limit of pressure $P1_{limit}$ and more, checking S211 of the other analysis flow channel 20 is performed.

In comparison S207 between the maximum pressure presumed $P1_{max}$ and the upper limit of pressure $P1_{limit}$, when the maximum pressure presumed $P1_{max}$ is less than the upper limit of pressure the control unit 17 performs measurement execution S208 using the first analysis flow channel 20. That is, it is determined that the measurement using the first analysis flow channel 20 can be performed, and sample filling by the sample filling unit 14 of the first analysis flow channel 20 is performed. Thereafter, the sample is separated in the first separation column 15, and is detected by the mass spectrometer connected to the first analysis flow channel 20 by the switching valve 18.

The control unit 17 performs determination S209 whether there is next measurement. If there is the next measurement, measurement condition acquisition S202 of the next measurement is performed. If there is no next measurement, processing end S210 is performed.

When the maximum pressure presumed $P1_{max}$ is the upper limit of pressure $P1_{limit}$ and more, the control unit 17 performs checking S211 of the other analysis flow channel 20. The checking here is to check whether the other analysis flow channel 20 (the second analysis flow channel 20) can be used. For example, if the sample is not separated by the second analysis flow channel 20, the remaining amounts of the eluents of the eluent bottle 11 connected to the second analysis flow channel 20 are sufficient, and the usage preparation (equilibration and heating) of the separation column 15 (the second separation column 15) of the second analysis flow channel 20 is completed, it is determined that the second analysis flow channel 20 can be used.

Processing contents from measurement condition acquisition S212 to calculation S216 of the maximum pressure presumed $P1_{max}$ in the other analysis flow channel 20 (the second analysis flow channel 20) are the same as processing contents from measurement condition acquisition S202 to calculation S206 of the maximum pressure presumed $P1_{max}$ in the first analysis flow channel 20, except that the target is the second analysis flow channel 20 instead of the first analysis flow channel 20.

After the calculation S216 of the maximum pressure presumed $P1_{max}$ in the second analysis flow channel 20 is performed, the control unit 17 performs comparison S217 between the maximum pressure presumed $P1_{max}$ and the upper limit of pressure $P1_{limit}$ in the second analysis flow channel 20. When the maximum pressure presumed $P1_{max}$ is less than the upper limit of pressure $P1_{limit}$, the control unit 17 performs measurement execution S218 using the second analysis flow channel 20. If the maximum pressure presumed $P1_{max}$ is the upper limit of pressure $P1_{limit}$ and more, processing end S210 is performed.

When the maximum pressure presumed $P1_{max}$ in comparison S217 between the maximum pressure presumed $P1_{max}$ and the upper limit of pressure $P1_{limit}$ in the second analysis flow channel 20 is less than the upper limit of pressure $P1_{limit}$, the control unit 17 performs measurement execution S208 by using the second analysis flow channel 20. That is, it is determined that measurement using the second analysis flow channel 20 can be performed, and the sample filling by the sample filling unit 14 of the second analysis flow channel 20 is performed. Thereafter, the sample is separated by the second separation column 15 and detected by the mass spectrometer as the detector 16 connected to the second analysis flow channel 20 by the switching valve 18.

The control unit 17 performs determination S219 whether there is next measurement. If there is the next measurement, measurement condition acquisition S212 of the next measurement is performed. If there is no next measurement, processing end S210 is performed.

Acquisition S213 of the upper limit of pressure and subsequent processing after measurement condition acquisition S212 of the next measurement is performed are performed by the second analysis flow channel 20. This is because, it is estimated that the deterioration of the first separation column 15 progresses in the first analysis flow channel 20, and the pressure is in the state of the pressure change 502C when the separation column 15 illustrated in FIG. 4 is further deteriorated. If parameters of the first analysis flow channel 20 are changed in a case where the first separation column 15 is replaced or the like, the determination of a propriety of measurement using the analysis flow channel 20 illustrated in FIG. 6 may start from S201.

When comparison S217 between the maximum pressure presumed $P1_{max}$ and the upper limit of pressure $P1_{limit}$ in the second analysis flow channel 20 is performed, and the maximum pressure presumed $P1_{max}$ is the upper limit of pressure $P1_{limit}$ and more, and when there are still other analysis flow channels 20 (a third analysis flow channel 20, a fourth analysis flow channel 20, and the like), processing from checking S210 of the other analysis flow channels 20 to determination S219 whether there is the next measurement may be performed on the corresponding other analysis flow channels 20.

As described above, according to the invention, if it is determined that the maximum pressure presumed in one of the analysis flow channels 20 exceeds the setting pressure, the sample filling can be performed by the other analysis flow channel 20.

<Modification of the Invention>

In the above embodiments, as examples of the eluents, methanol and distilled water are provided, but the technique of the invention can be applied to the other eluents. The mixed eluents are not limited to two types and may be three types and more. The configuration in which the eluent bottle 11 and the pump 12 are paired is exemplified, but the configuration in which the number of the pumps 12 is less than the number of the eluent bottles 11 and the eluent bottle 11 connected to the pump 12 is switched by the switching valve may be used.

In the above embodiments, each parameter is stored by the control unit 17, but the parameters may be acquired by direct measurement during manufacture of the liquid chromatograph 1, startup, analysis operation, maintenance, or the like and may be acquired from an external server via the network. The control unit 17 does not have to store all elements exemplified as items of each parameter, and the control unit 17 may be able to acquire elements required for estimating liquid feeding pressure.

In the above embodiments, a case where a mass spectrometer is used as the detector 16 is exemplified, but other spectrometers may be used.

In the above embodiments, the control unit 17 can be configured by hardware such as a circuit device implementing the function or configured by an arithmetic device executing software implementing the function. A form in which the single control unit 17 controls each part described in the embodiments is described, but the individual control unit 17 may be provided for each unit. The control unit 17 may be incorporated in the liquid chromatograph 1 or may be an external controller.

In the above embodiments, the control unit 17 monitors the pressure of the analysis flow channel 20 detected by the pressure sensor 13, determines a propriety of measurement using the analysis flow channel 20, that is, changes the operation of the sample filling unit 14 when the predetermined condition is satisfied. However, an alert may be issued instead. The alert may have any form. For example, it is conceivable to display an alert image on a screen (not illustrated) connected to the control unit 17, to operate an alarm device, and to output data describing the content of the alert.

In the above embodiments, data is read from data table stored by the control unit 17, but the user may input the data to the control unit 17 by via an input unit (not illustrated), or the control unit 17 may acquire the data from other control device via communication.

The invention is not limited to the above-described embodiments and includes various modifications. For example, the above-described embodiments are described in detail to explain the invention in an easy-to-understand manner and are not necessarily limited to those having all the described configurations. It is possible to replace a part of the configuration of one embodiment with the configuration of another embodiment, and it is also possible to add the configuration of another embodiment to the configuration of one embodiment. It is possible to add, delete, or replace a part of the configuration of each embodiment with another configuration.

REFERENCE SIGNS LIST

1: liquid chromatograph
11: eluent bottle
12: pump
13: pressure sensor
14: sample filling unit
15: separation column
16: detector
17: control unit
18: switching valve
20: analysis flow channel

The invention claimed is:

1. A method of controlling a liquid chromatograph comprising:
a pump having a gradient function capable of feeding liquid while changing composition of a plurality of eluents, according to gradient liquid feeding conditions;
a sample filling unit for filling a sample;
a separation column;
an analysis flow channel which connects the pump to the separation column passing through the sample filling unit; and
a pressure sensor which detects a pressure within the analysis flow channel during liquid feeding by the pump, wherein
a maximum pressure presumed during measurement is calculated based on an initial pressure as a pressure within the analysis flow channel when the pump starts feeding liquid and the gradient liquid feeding conditions, and
when the maximum pressure presumed is determined to be a predetermined upper limit of pressure and more, the sample filling is not performed.

2. The method of controlling the liquid chromatograph according to claim 1, further comprising:
two or more analysis flow channels each including the liquid feeding pump, the sample filling unit, and the separation column; and
one or more detectors arranged downstream of the analysis flow channels, wherein
when the maximum pressure presumed in one of the analysis flow channels is determined to be the upper limit of pressure and more, the sample filling is performed in the other analysis flow channel.

3. A liquid chromatograph comprising:
a pump having a gradient function capable of feeding liquid while changing composition of a plurality of eluents, according to gradient liquid feeding conditions;
a sample filling unit for filling a sample;
a separation column;
an analysis flow channel which connects the pump to the separation column passing through the sample filling unit;
a pressure sensor which detects a pressure within the analysis flow channel during liquid feeding by the pump; and
a control unit, wherein
the control unit
calculates a maximum pressure presumed during measurement, based on an initial pressure as a pressure within the analysis flow channel when the pump starts liquid feeding and the gradient liquid feeding conditions, and
controls the sample filling unit not to perform the sample filling when the maximum pressure presumed is determined to be a predetermined upper limit of pressure and more.

4. The liquid chromatograph according to claim 3, further comprising:
two or more analysis flow channels each including a liquid feeding pump, the sample filling unit, and the separation column; and
one or more detectors arranged downstream of the analysis flow channels, wherein
when the maximum pressure presumed in one of the analysis flow channels is determined to be an upper limit of pressure and more, the sample filling unit is controlled to perform the sample filling in the other analysis flow channel.

\* \* \* \* \*